United States Patent Office 3,116,311
Patented Dec. 31, 1963

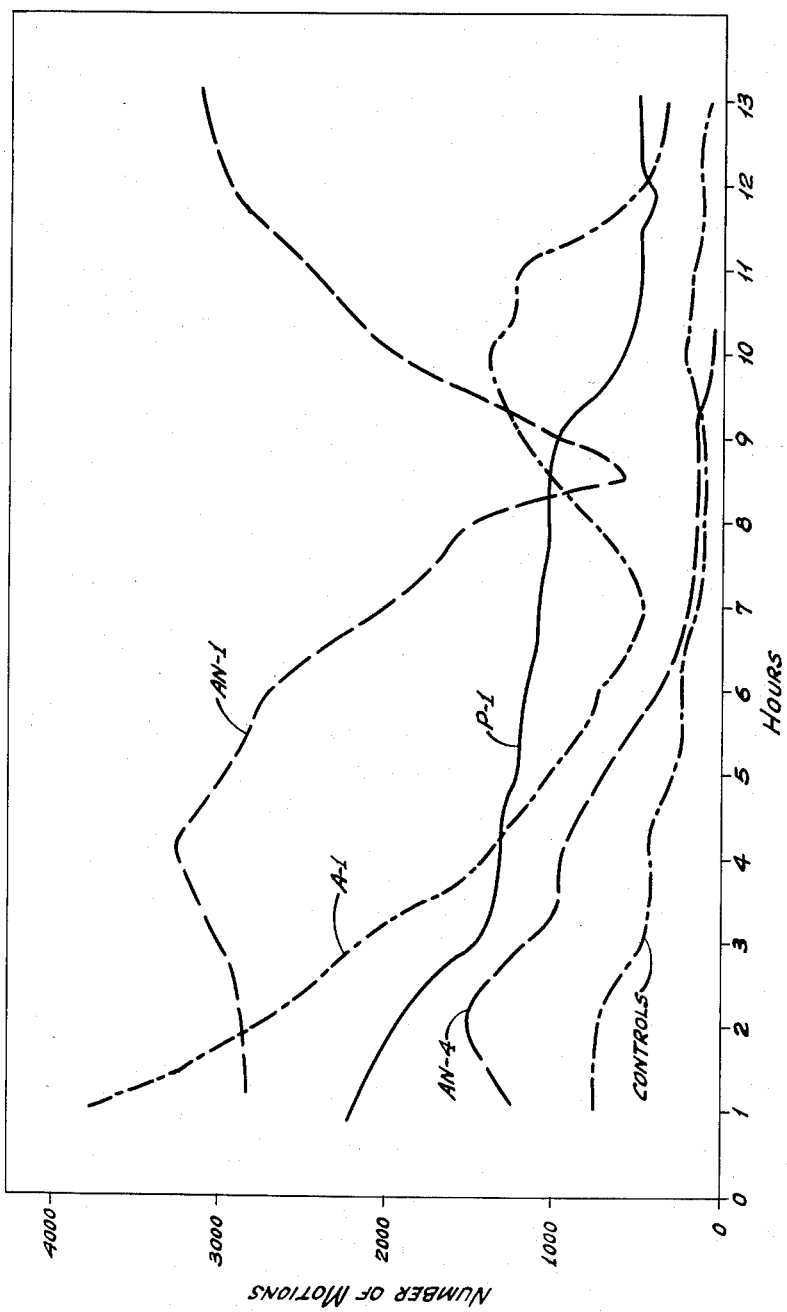

---

3,116,311
AMINONITRILES AND PROCESS FOR THEIR PREPARATION
Josef Klosa, Berlin-Zehlendorf, Germany, assignor to Delmar Chemicals Limited, Lachine, Quebec, Canada, a corporation of Canada
Filed Sept. 24, 1959, Ser. No. 841,987
6 Claims. (Cl. 260—465)

The present invention relates to aminonitriles of the following general formula:

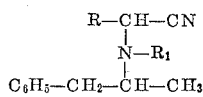

in which formula R=phenyl, methoxy-phenyl, di-methoxy-phenyl, or chlorophenyl, and $R_1$=H or —$CH_3$.

Applicant found that this group of compounds may be prepared from aldehydes, phenylisopropylamine or N-methyl-phenylisopropylamine and alkali cyanides. They may be prepared also from alphahalogeno-nitriles and phenylisopropylamine or N-methyl-phenylisopropylamine. In this latter case acid-neutralizing substances, such as alkaline carbonates, triethylamine, and the like, may be added to the reaction. In the first method the aldehydes may be used as such or as their sodium bisulfiite-adducts or any similar adducts which are generally useful in the preparation of nitriles.

The phenylisopropylamine or the N-methyl-phenylisopropylamine may be used as the racemates or in the form of their optical isomers.

This new group of compounds has shown surprising and unexpected pharmaco-dynamic activity. These compounds are central nervous stimulants. A number of aminonitriles has been previously described (German Patents 960,462 and 970,435) which were claimed to have antispasmodic and analgesic activity but not a central nervous stimulating action. Of the phenylisopropylamines it is known that their central nervous system (C.N.S.) activity, as well as their toxicity, diminishes through substitutions on the nitrogen atom. Only the methyl substitution in exchange of one of the two hydrogen atoms on the nitrogen atom increases the C.N.S. activity—N-methyl-phenylisopropylamine. So far this is the only known exception to this rule (F. Hauschild, Arch. Exp. Path. Pharmakol. vol. 191 (1938), p. 467). In contrast, I have found that the introduction of the acetonitrile-group intensifies and also prolongs the C.N.S. activity. It is surprising that the nitrile-group has this effect, since some other groups like the amido group or carboxyl group not only do not show this intensified and prolonged effect, but indeed abolish it entirely.

The toxicity of some of applicant's compounds can be compared with some commonly used C.N.S. stimulants, as follows:

| Name of Compounds | Code No. | $LD_{50}$ Mice S.C. |
|---|---|---|
| Caffeine | | 240 |
| Phenmetrazine Hydrochloride | P-1 | 183 |
| Amphetamine Sulfate | A-1 | 46 |
| Alpha-Phenyl-Alpha-(1-Phenylisopropyl) Amino-Acetonitrile | AN-1 | 58 |
| Alpha-(1-Phenylisopropyl)-Amino-Acetic Acid | AN-6 | 1,200 |
| Alpha- Phenyl - Alpha - (1-Phenylisopropyl) - Amino-Acetamide | AN-4 | 280 |

The determination and calculation of the $LD_{50}$ was done according to Weil (Biometrics, vol. 8, p. 249 (1952).

The administration of compound of this group and AN-1 quickly caused excitement in the animals. This action was sustained.

In comparative experiments when 10% of the $LD_{50}$ was administered to the animals the duration of the stimulating activity obtained with AN-1 was almost twice that obtained with A-1 and P-1. The amide (AN-4) and the acid (AN-6) had practically no stimulating action.

The curves set forth in the drawing further illustrate the C.N.S. stimulating effect of these compounds over a period of 13 hours. The method used in these experiments was the rotating jittercage which was connected to an automatic registering device which counted the number of movements of the animals. These numbers were taken at regular intervals and the results evaluated by the usual mathematical statistical methods. (J. H. Burns et al., Biological Standardization, Oxford, 1950). The weight of the mice was 18–22 gms. The dose was 10 mg./kg. subcutaneous (s.c.) of each compound. For each compound 20 animals were used.

In the graph in which the number of motions (corresponding to C.N.S. stimulating activity) are plotted against time, the upper solid, dashed and dot-dashed lines relate to the results obtained respectively with the administration of AN-1 and A-1, while the lower such set of curves relate respectively to results obtained by the administration of P-1, AN-4 and no medicament (controls).

It is obvious from these curves that the C.N.S. stimulating effect of AN-1 is relatively prolonged. After the sixth hour there is a passing phase of fatigue after which the C.N.S. stimulating effect increases again. In the compound in which an amido-group replaces the nitrile-group (AN-4) there is practically no stimulating effect in a dose of 10 mg./kg.

When the dose was reduced in this experiment to 1 mg./kg. no stimulating effect could be detected with either A-1 or P-1. However, the effect was still there after the administration of such doses of the compounds of the present invention.

It is obvious that applicant's compounds are valuable as pharmaceuticals. The acid addition salts of pharmacologically acceptable acids may be conventionally made.

The preparation of these compounds may be illustrated by the following examples:

*Example 1. Alpha-Phenyl-Alpha-N-(1-Phenylisopropyl)-Amino-Acetonitrile (AN-1)*

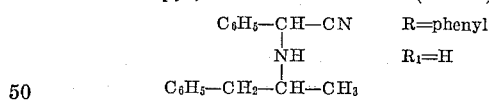

(α) 70 grms. dl-beta-phenylisopropylamine base are suspended in 100 ml. water. This mixture is neutralized with 4/N HCl. A solution of dl-phenylisopropylamine hydrochloride is so obtained which is put into a flask equipped with a reflux-condenser, a dropping funnel and a stirrer. A solution of 25 gms. sodium cyanide in 100 ml. water is added within five minutes. Keeping the temperature under 50° C., a solution of 70 ml. freshly distilled benzaldehyde in 250 ml. methanol is added over a period of 30 minutes. An oil precipitates which soon solidifies to white crystals. After standing two hours the crystals are filtered, washed with water and dried. M.P. 85–87° C. The product can be purified by dissolving it in alcohol and adding water cautiously to the solution. Yield: 85–90%.

This is the base of the desired compound. The hydrochloride may be prepared by dissolving the base in alcohol, adding an alcoholic solution of hydrochloric acid and some ether. It can be obtained also by simply adding the calculated amount of concentrated hydrochloric acid to an alcoholic solution of the base. The hydrochloride sinters at 102–104° and melts at 158–160° C.

The sulfate can be prepared in an analogous manner. M.P. 134–136° C. The nicotinate may be prepared by melting the base together with nicotinic acid.

(b) Instead of the hydrochloride of the beta dl-phenyl-isopropylamine hydrochloride, the sulfate may be also used. Reacted in the same way with sodium or potassium cyanide and then with benzaldehyde as described in (a) it will yield the desired compound.

(c) When d-beta-phenylisopropylamine is used as the starting material the dextro-alpha-phenyl-alpha-N-(1-phenylisopropyl)aminoacetonitrile is obtained. This is an oil. The hydrochloride obtained as above melts at 130–131° C.

(d) Another method to prepare AN-1 consists in reacting 0.5 mol of alpha-phenyl-alpha-bromo-acetonitrile with 1 mol dl-beta-phenylisopropylamine for 3–5 hours under a reflux in benzene or toluene. The solvent is decanted from a solid residue and is shaken with 4 N hydrochloric acid. The hydrochloride of AN-1 crystallizes.

*Example 2. Alpha-(p-Methoxyphenyl)-Alpha-N-(1-Phenylisopropyl)-Amino-Acetonitrile*

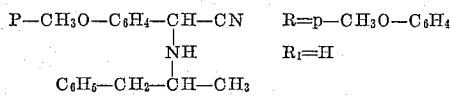

Prepared from dl-beta-phenylisopropylamine, an alkali cyanide and anisaldehyde in the same manner as described in Example 1. The free base is an oil, the hydrochloride, prepared as above, has a M.P. of 121–123° C. The dextro-compound prepared from d-beta-phenylisopropylamine is also an oil, the hydrochloride M.P. 123–125° C.

*Example 3. Alpha-(3,4-Dimethoxyphenyl)-Alpha-N-(1-Phenylisopropyl)-Amino-Acetonitrile*

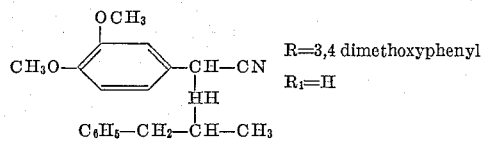

Prepared from veratraldehyde or from alpha-(3,4-dimethoxyprenyl)-alpha-brom-acetonitrile as described in Example 1.

*Example 4. Alpha-(p-Chlorophenyl)-Alpha-N-(1-Phenylisopropyl)-Amino-Acetonitrile*

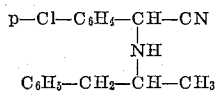

From p-chlorobenzaldehyde according to the method described in Example 1. The hydrochloride sinters at 133–135° C. and melts at 150–152° C.

*Example 5. Alpha-Phenyl-Alpha-N-(1-Phenylisopropyl)-Methylamino-Acetonitrile*

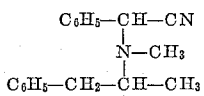

13 gms. dl-1-phenyl-2-methylamino-propane hydrochloride are dissolved in 30 ml. water. A solution of 5 gms. sodium cyanide in 20 ml. water is added. Then is added a solution of 14 ml. benzaldehyde in 50 ml. methanol. The mixture heats up some and an oil separates. After a few hours standing this oil is extracted with ether. From the ether the product is extracted with 2 N hydrochloric acid. This solution is made alkaline and the precipitated oil taken up in ether. After removal of the ether by distillation, an oil remains. From this oil, which is the base of the desired product, the hydrochloride is prepared by dissolving the oil in ether and adding an alcoholic hydrochloric acid. M.P. of the hydrochloride 110–112° C. Yield: about 80%.

*Example 6. Alpha-(p-Methoxyphenyl)-Alpha-N-(-1-Phenylisopropyl)-Methylamino-Acetonitrile*

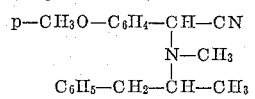

From anisaldehyde, as in Example 5. The hydrochloride melts at 128–130° C.

*Example 7. Alpha-(p-Chlorophenyl)-N-(1-Phenylisopropyl)-Methylamino-Acetonirtile*

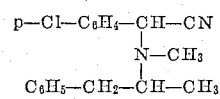

From p-chlorobenzaldehyde, as in Example 5. The hydrochloride melts at 156–158° C.

It is not desired to be limited except as set forth in the following claims, the above description being by way of illustration of the invention.

What is claimed is:

1. A compound selected from the group consisting of
   alpha-phenyl-alpha-N-(1-phenylisopropyl)-amino-acetonitrile,
   alpha-(p-methoxyphenyl)-alpha-N-(1-phenylisopropyl)-amino-acetonitrile,
   alpha-(p-chlorophenyl)-alpha-N-(1-phenylisopropyl)-amino-acetonitrile,
   alpha-phenyl-alpha-N-(1-phenylisopropyl)-methylamino-acetonitrile,
   and the addition salts thereof with pharmaceutically acceptable acids.

2. Alpha - phenyl-alpha-N-(1-phenylisopropyl)-amino-acetonitrile.

3. Alpha - (p-methoxyphenyl)-alpha-N-(1-phenylisopropyl)-amino-acetonitrile.

4. Alpha - (p-chlorophenyl)-alpha-N-(1-phenylisopropyl)-amino-acetonitrile.

5. Alpha - phenyl-alpha-N-(1-phenylisopropyl)-methylamino-acetonitrile.

6. Alpha - phenyl-alpha-N-(1-phenylisopropyl)-amino-acetonitrile hydrochloride.

References Cited in the file of this patent

FOREIGN PATENTS 157,909    Germany _____ Nov. 14, 1901

OTHER REFERENCES

Tutwiler et al.: Jour. Org. Chem., vol. 19, No. 6, June 1954, pp. 910–911.

Moed et al.: Rec. Trav. Chim., 74, pp. 922–923 (1955).